US010599128B2

(12) United States Patent
Kawai et al.

(10) Patent No.: US 10,599,128 B2
(45) Date of Patent: Mar. 24, 2020

(54) CONTROL DEVICE FOR A MACHINE TOOL

(71) Applicant: MAKINO MILLING MACHINE CO., LTD., Tokyo (JP)

(72) Inventors: Rie Kawai, Aiko-gun (JP); Hideki Heishi, Aiko-gun (JP); Toshimasa Uetama, Aiko-gun (JP); Kenichi Ono, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 182 days.

(21) Appl. No.: 15/108,223

(22) PCT Filed: Dec. 27, 2013

(86) PCT No.: PCT/JP2013/085218
§ 371 (c)(1),
(2) Date: Jun. 24, 2016

(87) PCT Pub. No.: WO2015/097893
PCT Pub. Date: Jul. 2, 2015

(65) Prior Publication Data
US 2016/0327935 A1 Nov. 10, 2016

(51) Int. Cl.
*G05B 19/4065* (2006.01)
*G05B 19/401* (2006.01)
*G01B 11/00* (2006.01)

(52) U.S. Cl.
CPC ........ *G05B 19/4065* (2013.01); *G01B 11/005* (2013.01); *G05B 19/401* (2013.01); *G05B 2219/31304* (2013.01); *G05B 2219/37198* (2013.01); *G05B 2219/37228* (2013.01); *G05B 2219/37441* (2013.01); *G05B 2219/37452* (2013.01); *G05B 2219/37574* (2013.01); *Y02P 90/10* (2015.11)

(58) Field of Classification Search
CPC .... G05B 19/4065; G05B 19/401; Y02P 90/10
USPC ......................................................... 700/175
See application file for complete search history.

(56) References Cited

U.S. PATENT DOCUMENTS

| 6,549,824 B1 | 4/2003 | Satou et al. | |
| 7,457,684 B2 * | 11/2008 | Kamiya | ............. G05B 19/4093 700/159 |
| 8,269,830 B1 * | 9/2012 | Delaney | ........... G01N 21/95684 348/126 |

(Continued)

FOREIGN PATENT DOCUMENTS

| CN | 1292895 | 4/2001 |
| CN | 101028692 | 9/2007 |

(Continued)

OTHER PUBLICATIONS

International Search Report dated Feb. 10, 2014, directed to International Application No. PCT/JP2013/085218, 2 pages.

*Primary Examiner* — Santosh R Poudel
(74) *Attorney, Agent, or Firm* — Morrison & Foerster LLP

(57) ABSTRACT

A control apparatus for controlling a machine tool on the basis of a machining program is provided with: a storage unit which stores an inspection item list for a workpiece, said inspection item list being associated with the machining program; and a display unit which, when the machining program is executed, displays the stored inspection items associated with the machining program.

5 Claims, 6 Drawing Sheets

(56) References Cited

U.S. PATENT DOCUMENTS

| | | | |
|---|---|---|---|
| 8,438,746 B2* | 5/2013 | Usui | G01B 21/047 33/503 |
| 10,048,065 B2* | 8/2018 | Ould | G01B 21/04 |
| 2003/0152433 A1* | 8/2003 | Geissler | B23Q 1/70 409/233 |
| 2005/0085940 A1 | 4/2005 | Griggs et al. | |
| 2005/0250604 A1* | 11/2005 | Kasashima | A63B 37/0004 473/378 |
| 2006/0133663 A1* | 6/2006 | Delaney | G06T 7/0004 382/152 |
| 2007/0250204 A1 | 10/2007 | Ould et al. | |
| 2008/0051927 A1 | 2/2008 | Prestidge et al. | |
| 2010/0050837 A1* | 3/2010 | Ould | G01B 21/042 83/14 |
| 2011/0056085 A1* | 3/2011 | Jordil | G01B 5/008 33/503 |
| 2013/0116817 A1 | 5/2013 | Faughnan, Jr. et al. | |
| 2013/0139397 A1* | 6/2013 | Jordil | G01B 21/047 33/503 |
| 2014/0056507 A1* | 2/2014 | Doyle | G01B 11/002 382/152 |
| 2014/0366393 A1* | 12/2014 | Tschorn | G01B 5/012 33/503 |
| 2015/0077761 A1* | 3/2015 | Yamagata | G01B 11/005 356/601 |
| 2015/0169790 A1* | 6/2015 | Tseo | G05B 19/41875 700/98 |
| 2017/0031345 A1* | 2/2017 | Ono | G05B 19/409 |

FOREIGN PATENT DOCUMENTS

| | | |
|---|---|---|
| JP | 61-249247 | 11/1986 |
| JP | 4-164550 | 6/1992 |
| JP | 10-207520 | 8/1998 |
| JP | 2003-28760 | 1/2003 |
| JP | 2013-257782 | 12/2013 |
| WO | WO-01/02914 | 1/2001 |

\* cited by examiner

CONTROL DEVICE FOR A MACHINE TOOL

CROSS-REFERENCE TO RELATED APPLICATIONS

This application is a U.S. National Stage patent application of International Patent Application No. PCT/JP2013/085218, filed Dec. 27, 2013, which is hereby incorporated by reference in the present disclosure in its entirety.

FIELD OF THE INVENTION

The invention relates to a control device for a machine tool which can carry out an inspection of a machined workpiece on the machine tool.

BACKGROUND OF THE INVENTION

In NC machine tools, the machining accuracy may be changed due to wear of tools, thermal deformation of the machine tool by the changing in ambient temperature or the like. Therefore, there is a control device for a machine tool, the control device measuring a predetermined portion of a workpiece, after one or all of machining processes for the workpieces, to determine whether or not the machining process(es) has (have) been carried out within a predetermined machining accuracy.

For example, Patent Literature 1 describes an NC device which measures a machined workpiece in accordance with a measuring program, storing the measurement data in the NC device and displays the measurement results based on the measurement data.

PRIOR ART DOCUMENTS

Patent Literature 1: JP-A-H10-207520

SUMMARY OF THE INVENTION

According to the NC device of Patent Literature 1, it is possible to store and display the measurement results. However, the portions of the machined workpiece to be measured and the measuring method are not clearly shown to an operator when measuring the machined workpiece. Therefore, there is a problem accompanied with the NC device of Patent Literature 1 that the operator cannot judge whether or not the appropriate portion is measured by the correct measuring method.

The invention is directed to solve the problem of the prior art, and the object of the invention is to provide a control device for a machine tool, enabling a machined workpiece to be inspected on the machine tool.

To achieve the already explained object, according to the present invention, a control device for controlling a machine tool based on a machining program, comprising a storing section for storing an inspection item list for a workpiece corresponding to the machining program, and a displaying section for displaying the inspection items stored in association with the machining program is provided.

When inspecting a machined workpiece, the invention allows an operator to understand the inspection, i.e., the inspecting method and the portion to be inspected clearly, and therefore facilitates the inspection without omission.

DETAILED DESCRIPTION OF THE INVENTION

With reference to the drawings, an embodiment of the invention will be described below.

Figure 1:
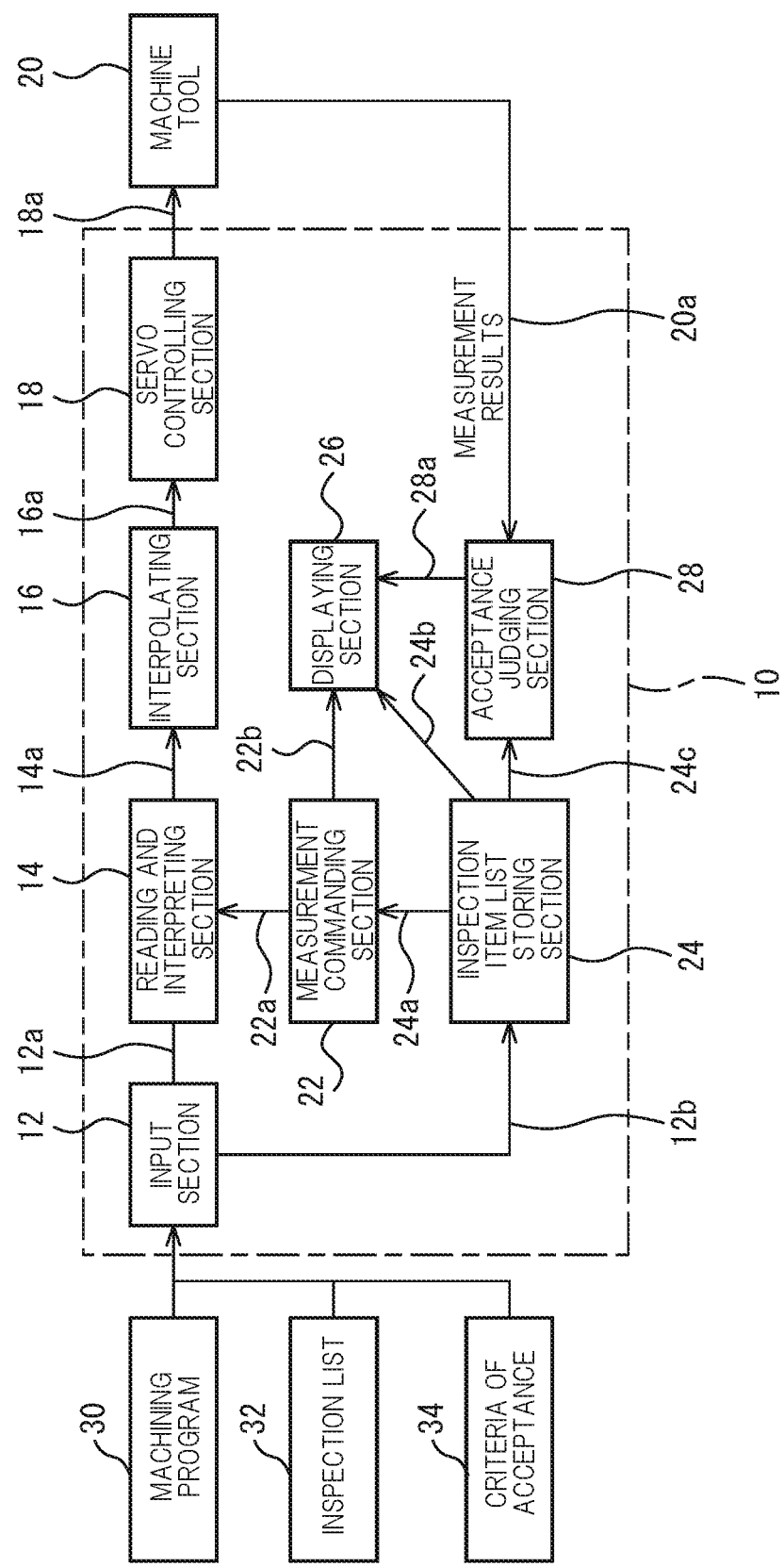
FIG. 1 is a block diagram showing an example of a control device for a machine tool according to the invention.

In FIG. 1, a control device 10 of a machine tool 20 according to an embodiment of the invention can be formed so as to include an NC device of the machine tool 20, and comprises an input section 12, a reading and interpreting section 14, a interpolating section 16, a servo-control section 18, a measurement commanding section 22, a list of measuring item storage section 24, a displaying section 26 and an acceptance judging section 28. The input section 12 may comprise a network means e.g., a LAN, a keyboard or a touch panel. The displaying section 26 can be formed by a display attached to an NC device of the machine tool 20.

A machining program 30, an inspection item list 32 and acceptance criteria 34 are input into the input section 12. The machining program 30 can be generated by using for example a CAM system. The inspection item list 32 and the acceptance criteria 34 may be decided, in consideration of requirements for the workpiece to be machined in accordance with the machining program 30, by a CAM operator or an operator of the machine tool 20.

The machining program 30 input into the input section 12 is output to the reading and interpreting section 14 as shown by an arrow 12a. The reading and interpreting section 14 reads and interprets the machining program so that operation commands 14a are output. The operation commands include the feeding amounts and speeds in the X-, Y- and Z-axis directions. The operation commands 14a, which have been output by the reading and interpreting section 14, are sent to the interpolating section 16.

The interpolating section 16 interpolates the operation commands 14, in the X-, Y- and Z-axis directions, via calculation based on an interpolation function, so that position commands (pulse position commands) 16a are output to the servo-control section 18 based on the respective X-, Y- and Z-axial feed speeds. Based on the respective X-, Y- and Z-axial position commands 16a, the servo-control section 18 outputs electric currents 18a to X-, Y- and Z-axial servo-motors (not shown) of the machine tool 20, for driving X-, Y- and Z-axes of the machine tool 20 respectively.

The inspection item list 32 and the acceptance criteria 34 are sent to the inspection item list storing section 24, as shown by an arrow 12b, along with the machining program 30. The inspection item list storing section 24 stores the inspection item list 32 and the acceptance criteria 34 in association with the machining program 30. The inspection item list 32 includes at least a measuring mode and a measuring method. The measuring mode includes manual, semi-automatic and automatic measurements. The measuring method includes an inner circular surface measurement for measuring the inner diameter of a circular recess, an outer circular surface measurement for measuring the outer diameter of a circular column, a pocket measurement for measuring the lengths of an opening of a rectangular recess in orthogonal two directions, a groove measurement for measuring the width of a groove, a block measurement for measuring the lengths between two pairs of opposite sides of a rectangular boss, a reference surface measurement and a reference point measurement. Alternatively, an operator may input directly the inspection item list via a key board or a touch panel of the input section 12.

The inspection item storing section 24 sends, to the measurement commanding section 22, inspection items relative to the machining program 30 based on the inspection item list 32 received from the input section 12 (arrow 24*a*). The inspection item list storing section 24 further sends the inspection item list to the displaying section 26 as shown by an arrow 24*b*, and sends the acceptance criteria 34 to the acceptance judging section 28 as shown by an arrow 24*c*.

The measurement commanding section 22 contains, in advance, measuring programs corresponding to the respective inspection items included in the inspection item list 32, and measurement guidance corresponding to the respective measuring programs. The measurement commanding section 22 sends a measuring program, corresponding to the inspection item received from the inspection item list storing section 24, to the reading and interpreting section 14, as shown by an arrow 22*a*, and sends a measurement guidance to the displaying section 26 as shown by an arrow 22*d*.

The acceptance judging section 28 receives measurement results from the machine tool, as shown by an arrow 20*a*, to compare it with the acceptance criteria 34 received from the inspection item list storing section 24 whereby it is determined whether or not the machined workpiece is processed within a predetermined machining accuracy. The determination result is sent to the displaying section 26 as shown by an arrow 28*a*.

The operation of the embodiment will be described below.

Figure 2:
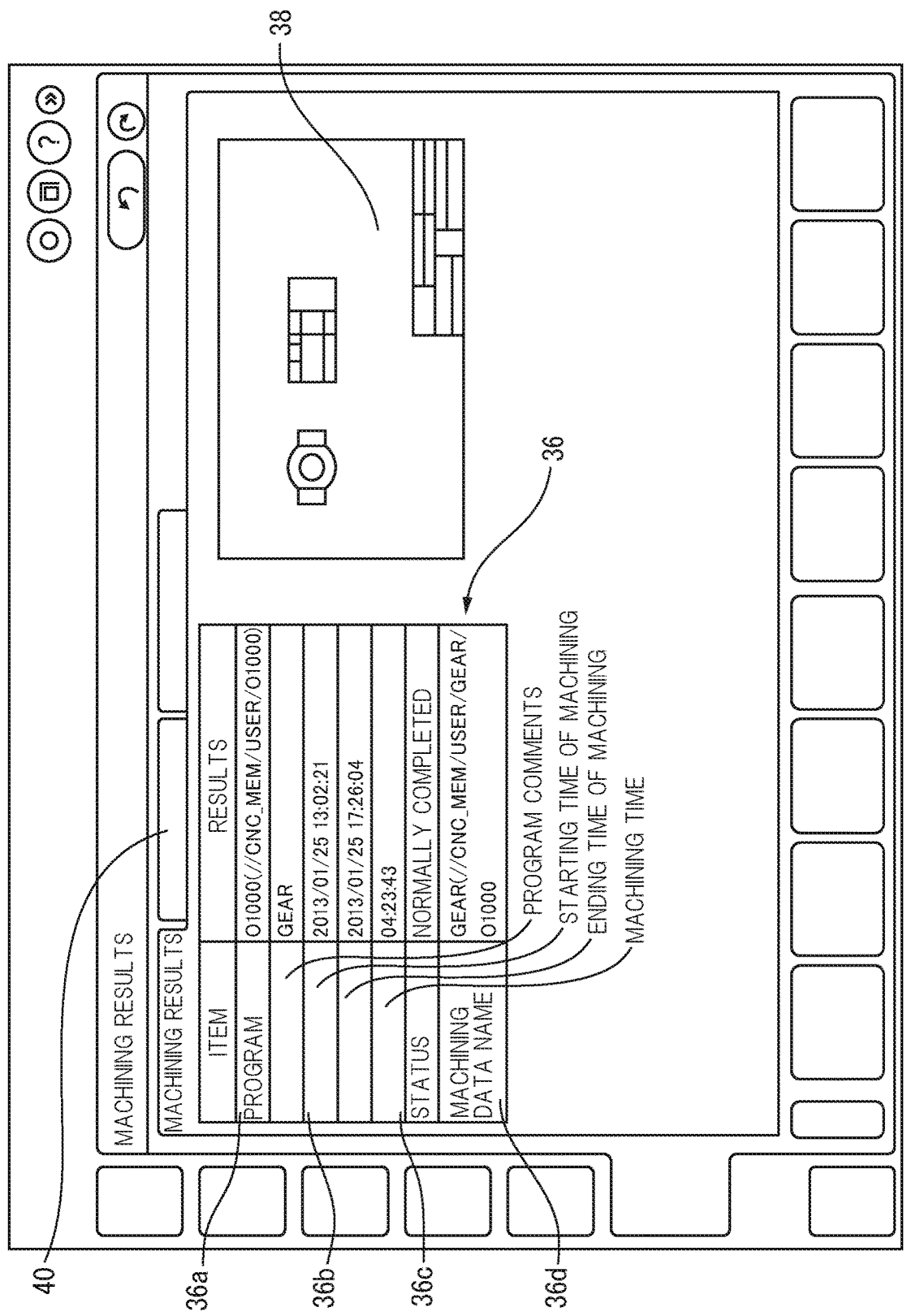
FIG. 2 is an example of machining results displayed on the displaying section of the control device of FIG. 1.

When a machining process, according to a machining program, is completed, the machining results are displayed as shown in FIG. 2. In the machining result window, shown in FIG. 2 as an example, a machining results table 36 is displayed along with a drawing 38 relative to the completed machining program. The machining results table 36 may include program number 36*a*, the starting time of machining 36*b*, the time required for machining 36*c*, machining data name 36*d* which indicates a folder containing a computer file such as a text file describing the data in relation to the tools and the workpiece. The drawing 38 may be output to the displaying section 26 from a server via a LAN, the input section 12 and the inspection item list 24, by using a program number (O1000 in FIG. 2) of the machining program as an argument.

Accordingly, displaying the machining results before the inspection of the machined workpiece allows an operator to confirm easily that the machining process completed successfully. In particular, the drawing 38, relative to the machining program, allows an operator to confirm which machining program was used for the machining. Further, combining the machining results into a computer file as shown in FIG. 2 facilitates to refer to past machining results.

Figure 3:
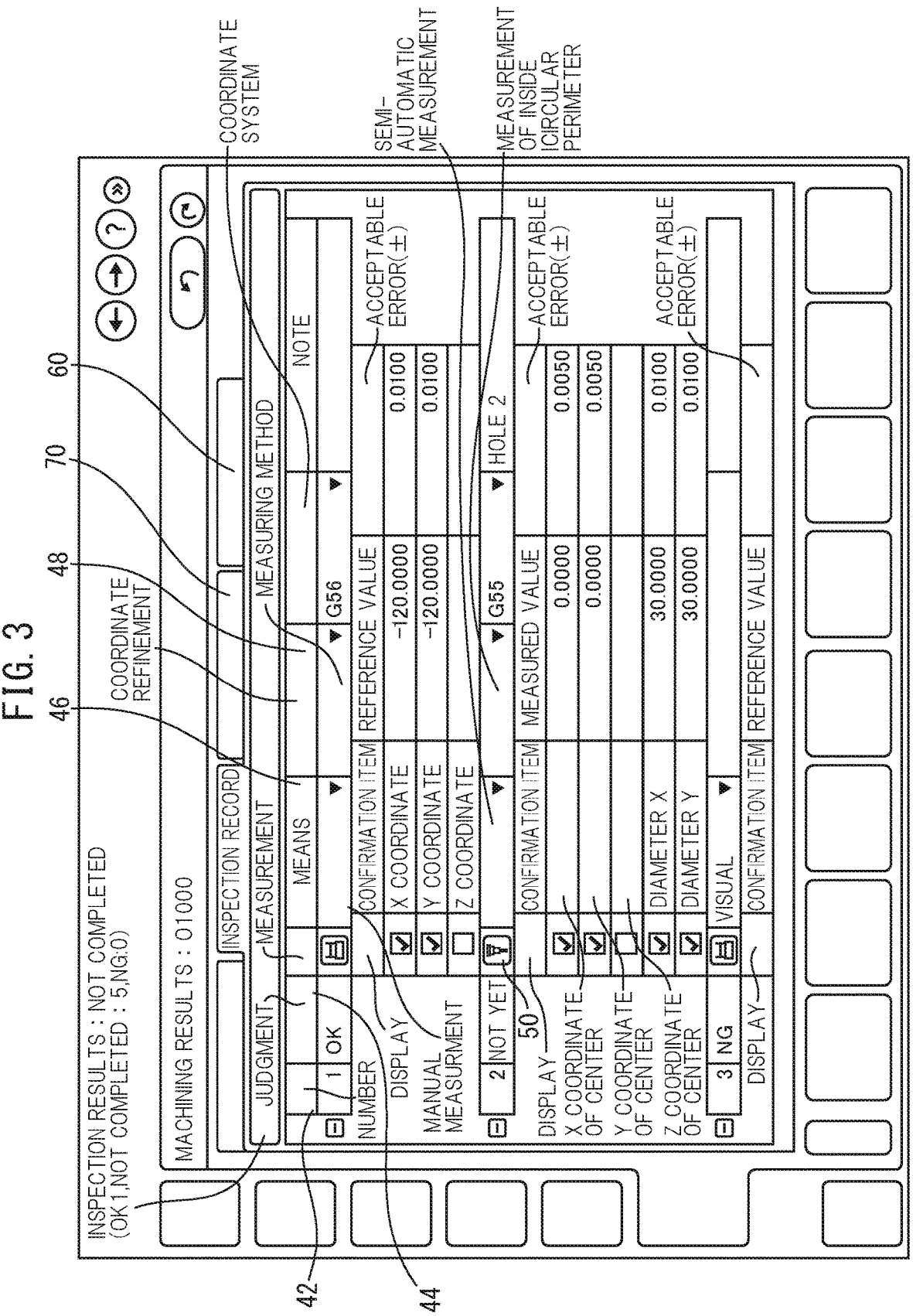
FIG. 3 is an example of inspection item list displayed on the displaying section of the control device of FIG. 1.

When an operator clicks or taps a tab 40 of the machining result window displayed on the displaying section 26, an inspection item list window, shown in FIG. 3, is displayed on the displaying section 26 based on the inspection item list received from the inspection item list storing section 24. In the inspection item list window of FIG. 3, inspection number 42 (in FIG. 4, 1-3 are indicated as the inspection number), judgment 44, of the measurement results, the measuring mode 46 and the measuring method 48 and so on are shown.

In the example of FIG. 3, the inspection number 1 indicates fetching of the coordinate as the measuring method 48 and manual measurement as the measuring mode 46. In particular, the X-, Y- or Z-feed axes of the machine tool 20 is operated manually so that a measuring probe is moved in one direction along the X-, Y- or Z-axis toward a portion of the machined workpiece to be measured, for example a predetermined apex or a side face whereby the X-, Y- or Z-axis coordinate value is read by a coordinate reading means of the feed device of the machine tool 20, for example a digital scale (not shown) of the X-, Y- or Z-axis, when the measuring probe touches the predetermined portion. The inspection item list window of FIG. 3 includes the judgment 44 of the measurement results as described above, in which the machined workpiece is acceptable in relation to the inspection of number 1, but is not acceptable in relation to the inspection of number 3. The inspection of number 2 was not conducted.

Further, in the inspection item list window of FIG. 3, the inspection of number 2 indicates that the inner circular surface measurement, as the measuring method 48, is conducted by the semi-automatic mode, as the measuring mode 46. The inner circular surface measurement is a measuring method for measuring the inner diameter of a circular recess as described above, and includes, as the measurement items, the measurement of the X- and Y-coordinates (Z-coordinate may be included if necessary) of the center of the circular recess, and the measurement of the diameter of the recess measured in both the X- and Y-axes directions. Furthermore, in the example of FIG. 3, the judgment of the inspection of number 2 is "not yet", which means that the inspection of this item has not been conducted yet.

Figure 4:
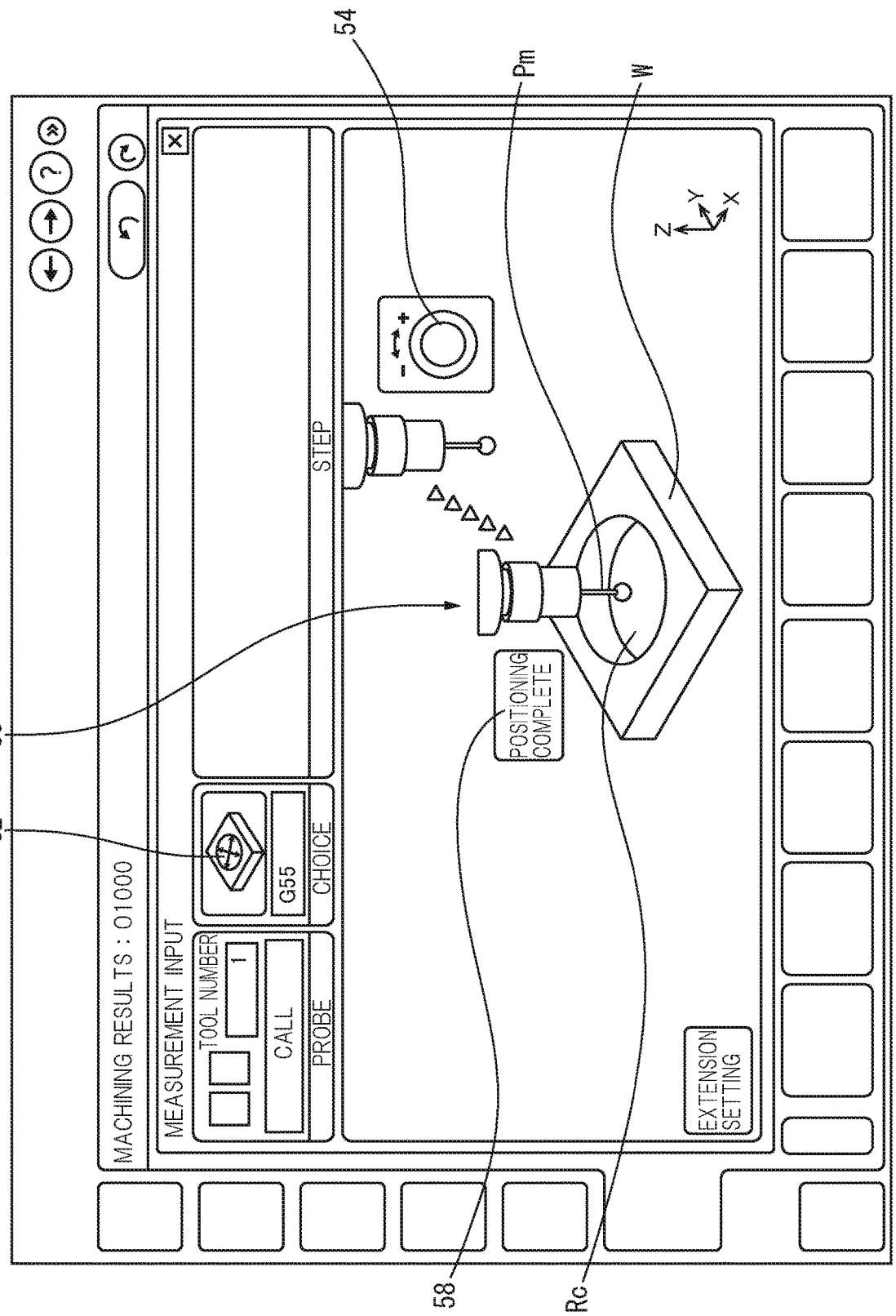
FIG. 4 is an example of a measuring guidance displayed on the displaying section of the control device of FIG. 1.

If an operator clicks or taps an inspection start button 50 of the inspection number 2, then a measurement guidance window, illustrating the procedure of the semi-automatic inner circular surface measurement, as shown in FIG. 4, is displayed in the displaying section 26, based on the measurement guidance received from the measurement commanding section 22. In the measurement guidance of FIG. 4, an icon 52 indicates the inner circular surface measurement as the measuring method, and an icon 54 indicates that a measuring probe Pm should be moved to inside the circular recess Rc, as shown by a graphic 56. When a positioning finish button 58 is clicked or tapped, after an operator confirms visually that the measuring probe Pm has been manually moved inside the circular recess Rc by the operator with X-, Y- and Z-axis handles of the machine tool 20, the inner circular surface measurement is automatically conducted by the machine tool 20. Accordingly, when the positioning finish button 58 is clicked or tapped, the measurement commanding section 22 sends the measuring program to the reading and interpreting section 14. The reading and interpreting section 14 reads and interprets the measuring program to send the operation commands to the interpolating section 16. The interpolating section 16 sends the position commands to the servo-control section 18. The servo-control section 18 outputs the drive currents to the X-, Y- and Z-axial servomotors of the machine tool 20.

The machine tool 20 drives the X-, Y- and Z-feed axes respectively based on a measuring program. Accordingly, the machine tool 20 calculates the measurement results based on the values of the X-, Y- and Z-axial digital scales when the measuring probe Pm, attached to the end of a spindle, contacts the machined workpiece W. The measurement results are send to the acceptance judging section 28. The acceptance judging section 28 compares the measurement results, which have been received from the machine tool 20, with the acceptance criteria, which have been received from the inspection item list storing section 24. The determination result is displayed on the displaying section 26. In the example of FIG. 3, the determination result is indicated in the judgment 44.

Figure 5:
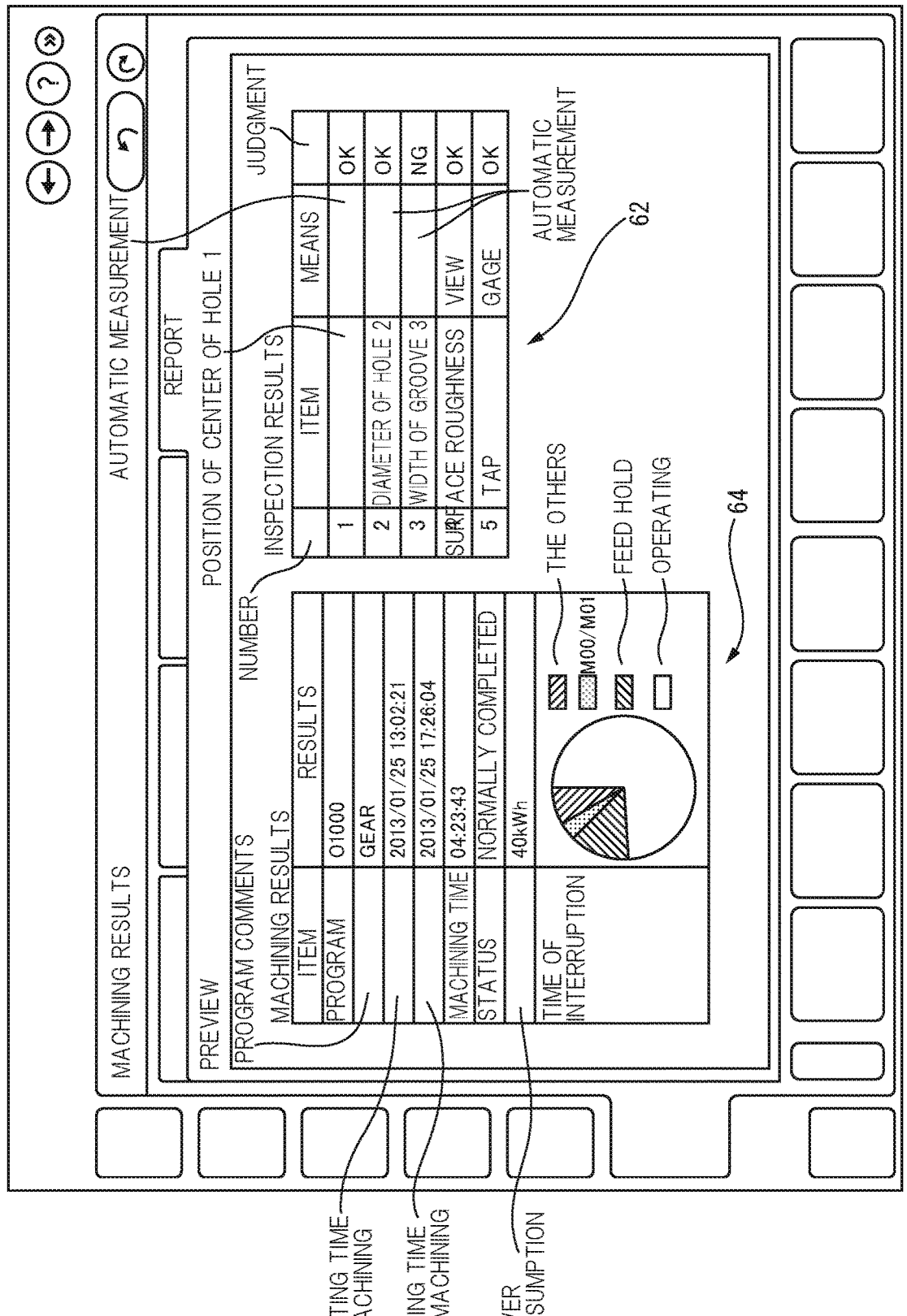
FIG. 5 is an example of inspection results displayed on the displaying section of the control device of FIG. 1.

A report window, shown in FIG. 5, is displayed by clicking or tapping a tab 60. An inspection results table 62 is shown in the report window along with a machining results table 62, which is similar to the machining results table 36, described above. The inspection results table 62 and the machining results table 64, which are shown in the report window, may be printed as a hard copy or stored in a server or the like as an electronic file.

Figure 6:
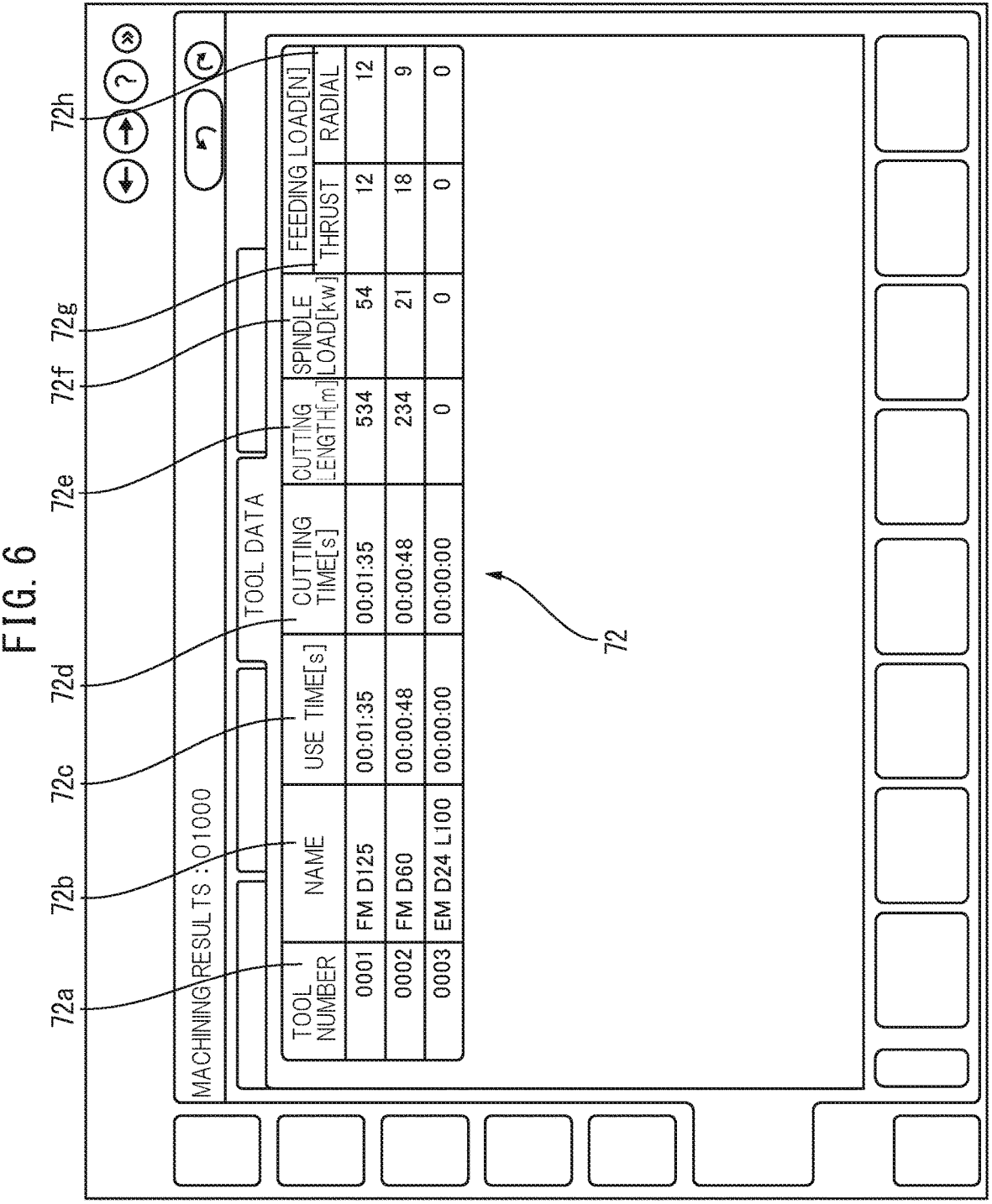
FIG. 6 is an example of tool data displayed on the displaying section of the control device of FIG. 1.

Further, a tool data table 72, shown in FIG. 6, containing data relative to all of the tools, which were used for carrying out the machining program, is displayed by clicking or tapping a tab 70 of the inspection item list window of FIG. 3. The tool data table 72 shows, in association with tool number 72a, tool name 72b, service time 72c, cutting time 72d, i.e., the actual time when the tool was used to cut, cutting length 72e, i.e., the length which the tool actually cut, spindle load 72f, i.e., the maximum load applied to the spindle to which the tool is attached, and thrust and radial spindle loads 72g and 72h, i.e., the maximum loads applied in the thrust and radial directions to the spindle to which the tool is attached.

As described above, the embodiment can display the inspection item list window shifted from the machining results window, allowing an operator to measure a machined workpiece in accordance with the inspection item list without hesitation, whereby the operator can execute the inspection without confusing what inspection should be executed.

The inspection item list may be separately composed or incorporated in a machining program by a programmer. Omission of inspection item can be prevented by incorporating a measuring program into a machining program. In order to incorporate a measuring program into a machining program, ID numbers may be attached to the measuring program portions whereby the measurement results are stored in the control device 10 in association with the ID numbers.

Further, an interlock may be incorporated into a machining program in order to prevent the next workpiece being machined before the acceptance judging section 28 completes the judgments in relation to all of the inspections described in the inspection item list.

The data relative to the status of use of the tools which were used for machining is displayed, enabling the tool lives to be estimated. Furthermore, the tool data includes the maximum load applied to the tool or the spindle, enabling to determine whether or not the cutting speed can be increased. Furthermore, the past maximum loads applied to the tools may be stored in the control device 10 whereby machining process can be stopped if a load larger than the maximum load is applied when machining in accordance with the same machining program.

REFERENCE SIGNS LIST

10 Control Device
12 Input Section
14 Reading and Interpreting Section
16 Interpolating Section
18 Servo-Control Section
20 Machine Tool
22 Measurement Commanding Section
24 Inspection Item List Storing Section
26 Displaying Section
28 Acceptance Judging Section
30 Machining Program
32 Inspection Item List
34 Acceptance Criteria
50 Inspection Starting Button
64 Machining Results Table

The invention claimed is:
1. A machine tool comprising:
a spindle to which a tool is attached, wherein a workpiece is machined by the tool while the tool is moved in X-, Y- and Z-axis directions relative to the workpiece based on a machining program;
a measuring probe attached to an end of the spindle so as to measure the machined workpiece while the measuring probe is moved in the X-, Y- and Z-axis directions based on a measuring program;
X-, Y- and Z-axis digital scales that read X-, Y- or Z-axis coordinates when the measuring probe contacts the machined workpiece;
a control device for controlling the machine tool, the control device comprising,
 a storing section for storing an inspection item list for the workpiece in association with a corresponding program number of the machining program, the inspection item list including portions to be measured and corresponding measuring methods; and
 a displaying section for displaying inspection items of the inspection item list stored in the storing section in association with the machining program so as to allow an operator to select the portions to be measured and the corresponding measuring methods,
 wherein the inspection item list includes measuring modes, which include manual measurement mode, semi-automatic mode, and automatic measurement mode,
 the control device stores the measuring program for executing the measuring methods of the automatic measurement mode described in the inspection item list, and reads the coordinates of a predetermined part of the machined workpiece measured by a measuring method of the manual measurement mode described in the inspection item list,
 the machined workpiece is measured by executing the stored measuring program so as to perform a measuring method of the automatic measurement mode without dismounting the machined workpiece from the machine tool, and
 the measuring method of the manual measurement mode, the measuring method of the semi-automatic measurement mode, and the measuring method of the automatic measurement mode are displayed in the inspection item list on the display section;
 wherein the displayed measuring method includes an inner circular surface measurement for measuring the inner diameter of a circular recess, an outer circular surface measurement for measuring the outer diameter of a circular column, a pocket measurement for measuring the lengths of an opening of a rectangular recess in orthogonal two directions, a groove measurement for measuring the width of a groove, a block measuring for measuring the lengths between two pairs of opposite sides of a rectangular boss, a reference surface measurement and a reference point measurement.

2. The machine tool according to claim 1, wherein the control device comprises an input section into which the inspection item list is input along the machining program.

3. The machine tool according to claim 1 wherein the control device stores a measuring guidance for instructing the procedures of the measuring method described in the inspection item list to an operator.

4. The machine tool according to claim 1, wherein the inspection item list is incorporated into the machining program.

5. The machine tool according to claim 1, wherein the storing section for storing the inspection item list stores acceptance criteria, and the control device determines whether or not the workpiece, machined by the machining program, is acceptable based on the acceptance criteria.

* * * * *